Sept. 21, 1971     C. E. CORTELYOU ET AL     3,606,965
DISPENSER FOR PARTICULATE AND PULVERULENT MATERIAL
Filed Dec. 23, 1968     2 Sheets-Sheet 1

CHARLES E. CORTELYOU, MICHAEL SCADUTO,
PASQUALE C. LAROSA, INVENTORS.

ATTORNEYS

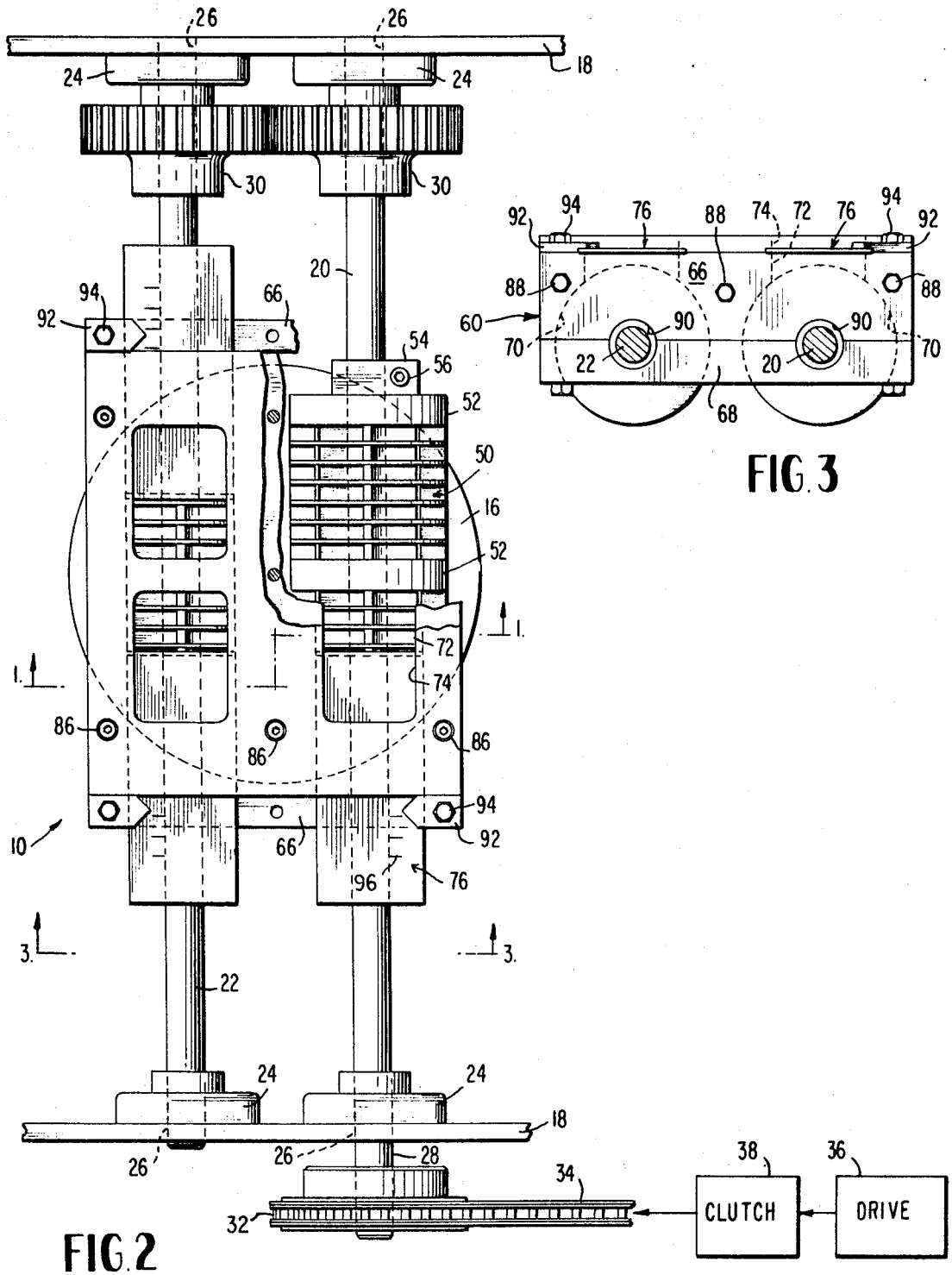

United States Patent Office 3,606,965
Patented Sept. 21, 1971

3,606,965
DISPENSER FOR PARTICULATE AND PULVERULENT MATERIAL
Charles E. Cortelyou, Litttle Silver, Michael Scaduto, North Arlington, and Pacquale C. La Rosa, North Brunswick, N.J., assignors to Turf-O-Matic, Inc., Oceanport, N.J.
Filed Dec. 23, 1968, Ser. No. 786,052
Int. Cl. G01f *11/06*
U.S. Cl. 222—312                             5 Claims

ABSTRACT OF THE DISCLOSURE

A dispenser particularly for use with lawn combines, which dispenses seeds and fertilizers by means of rotating, compartmented, cylindrical drums. The amount of material to be dispensed by the device can be accurately controlled by the number of compartments on the cylindrical drum that is exposed to the reservoir of materials.

BACKGROUND OF THE INVENTION

Field of the invention

This invention relates to a dispenser that can accurately dispense measured amounts of the particulate or pulverulent material from any number of reservoirs or hoppers containing the materials to be dispensed. The dispenser utilizes compartmented cylindrical drums that rotate about longitudinal axes thereby exposing successive compartments on the cylindrical drum to the supply of material in the reservoirs. Each compartment on the cylindrical drum represents a measured unit and any number of these compartments may be exposed to the supply of material so as to regulate the amount of material dispensed.

Description of prior art

Heretofore, dispensers used on lawn combines for seeds and fertilizers have constituted little more than a lawn spreader. This type of dispenser has an elongated shaft with radially extending vanes attached thereon which is in constant and full communication in the bottom of the hopper or reservoir of material to be dispensed. The vanes carry the material around with the hopper to be dispensed out of openings at the lower arc of their axis or rotation. Any means of adjusting the amount of material dispensed is achieved through changing the size of these openings at the bottom of the hopper.

Another example of dispensing seeds and fertilizers for use with lawn combines is that wherein hoppers are positioned above a conveyor belt with regulatable openings or valves at the bottom of the hoppers. The valves are opened or closed, as desired, to allow the material to drop onto the conveyor belt and then to be dispensed on the ground. The adjustability of the feed involved herein is limited to the opening and closing of the valve at the bottom of the hoppers which, in the absence of agitation or other means to keep the material flowing, is not considered to be accurate enough for optimum results. Also, the dispensing of the materials is not easily coordinated with the speed of the combine over the ground.

Another example of dispensers in use heretofore, is that of a sprocketed wheel much like that found on a water wheel wherein each bucket is a measured compartment. This provides reasonable accuracy in the measurement of the dispensed material but does not permit easy or effective change in the measured quantities. To regulate the quantities dispensed by such apparatus, it is necessary to disassemble the device to change the sprocket-type wheel to insert one with the measured compartments of the desired size.

SUMMARY OF THE INVENTION

This invention employs an elongated cylindrical-shaped member which has a plurality of measured compartments arranged in rows therealong. The elongated cylindrical member is journalled for rotation on a shaft and received in a base that surrounds the upper circumference of the cylindrical member. There is an aperture in the base that opens into the cylindrical member thereby allowing the material to be dispensed to drop into the compartments of the cylindrical member. A cover plate is adapted to slide in closing relation of the opening in the base to thereby gradually close off the rows of compartments on the elongated cylindrical member. Thus, by moving the sliding closing member along the opening, regulation from full opening of all rows of compartments, to a single row of compartments, or fully closed is able to be achieved.

Any number of these elongated cylindrical members may be used together depending upon the number of different materials desired to be dispensed. The elongated cylindrical members can be driven from the final drive of the combine on which it is used so that regardless of the speed of the combine over the ground, the accuracy of the materials to be dispensed per unit area is assured.

BRIEF DESCRIPTION OF THE DRAWING

FIG. 2 is a sectional view taken substantially along the line 2—2 of FIG. 1 with portions thereof broken away for clarity.

FIG. 3 is a sectional view taken substantially along the line 3—3 of FIG. 2.

BRIEF DESCRIPTION OF THE INVENTION

Figure 1:
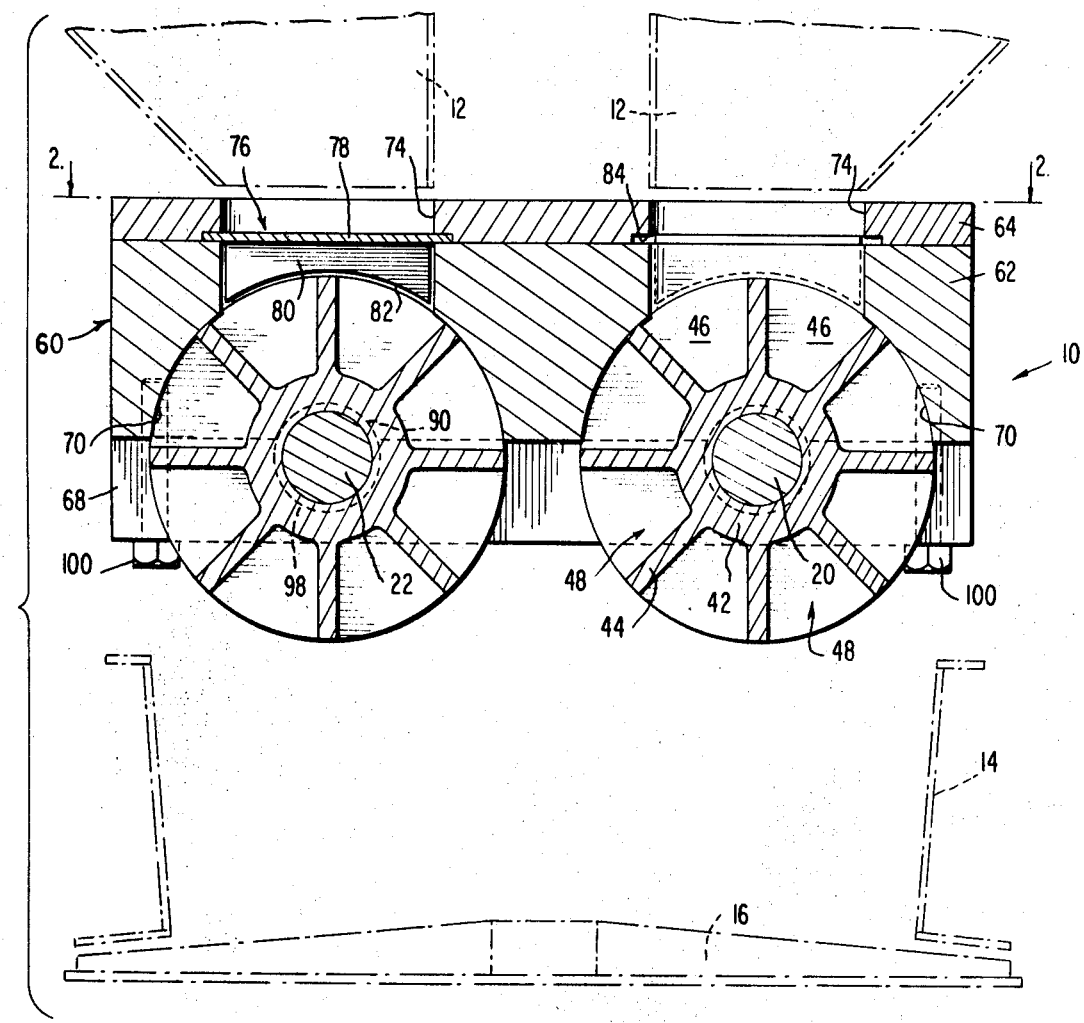
FIG. 1 is a side elevational view of the dispenser with parts of the combine on which it is used shown in phantom.

Referring now to the drawings, the dispenser is generally indicated by the reference 10 with a plurality of reservoirs or hoppers indicated in phantom by 12. Directly below the dispenser is shown a collecting chute 14 which receives the discharge of the measured material from the dispenser. With the measured materials being discharged into the collecting chute 14, the material can be dispensed by any one of a number of well-known means, such as the spinner 16 shown in FIGS. 1 and 2. While the details of the hoppers, the collecting chute and spinner do not form a part of the invention, they are included herein to show the environment in which the invention is to be used.

The dispenser assembly 10 is conveniently mounted between two parallel extending rails or members 18 of the combine. The dispenser 10 is mounted on and supported by two shafts 20 and 22 which are journalled for rotation in bearing blocks 24 secured to the rails 18. Shaft 20 is longer than shaft 22 and extends through its bearing blocks 24 and openings 26 in the rails 18 that are aligned therewith. The longer or drive shaft 20 has one end 28 thereof extending beyond the side rail 18. The shorter or drive shaft 22 extends parallel to the drive shaft 20 and likewise is journalled in bearing blocks 24 and extends through the openings 26 in the side rails. The shafts 20 and 22 are drivingly interconnected by a pair of gears 30, which have the same diameter and number of teeth and are fixed to the shafts. Both shafts will then rotate at the same r.p.m. as the driven shaft. A drive sprocket 32, fixed to the end 28 of the drive shaft 20, is driven by a chain 34 which is connected to any convenient drive source 36 by a clutch or other such disengageable means 38. The drive 36 may be a direct power take off from the drive shaft of the combine so as to insure that as the combine moves over the ground, the drive shaft 20 will be driven at the same relative number of r.p.m.'s per unit of ground covered to insure the accuracy of the material dispensed per unit area.

Figure 4:
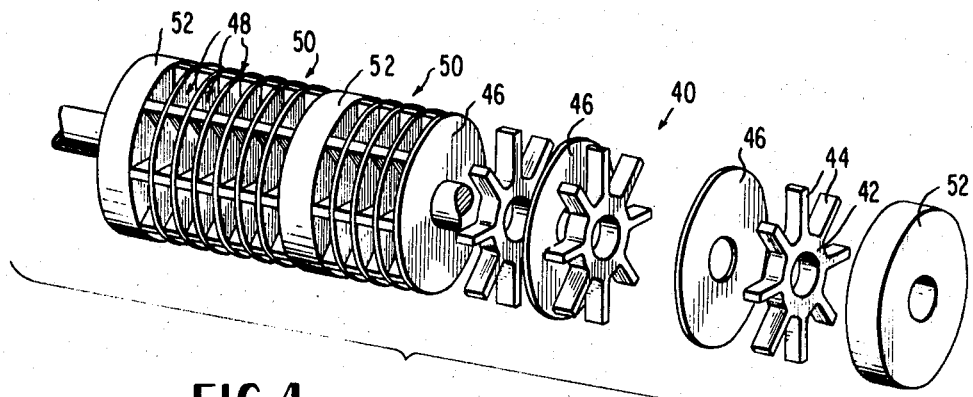
FIG. 4 is an exploded perspective view of the elongated cylindrical dispensing element.

The dispenser 10 also includes a compartmented cylindrical drum assembly 40 attached to each of the shafts 20 and 22. The drum assembly 40 can be formed in any convenient manner such as the composite structure shown in FIG. 4. As shown therin, a number of wheels 42 with radially extending vanes 44 are interposed between discs 46, which cooperate to form compartments 48 of a predetermined measured capacity. From this it can be seen that by varying the number of vanes 44 on each wheel, or by changing the thickness of each wheel the measured quantity of the compartments 48 can be varied if desired. The drum assembly is divided into sections 50 by spacer wheels 52 positioned at each end of the stack of wheels and discs and mid-way therebetween. Each cylindrical drum assembly 40, which includes the stacks of wheels 42 and discs 46, and the spacer wheels 52 are fixed to the shafts 20 and 22 for rotation therewith in any convenient manner. A split collar 54 is attached at each end of the drum assembly on each of the shafts to prevent movement of the assembly longitudinally of the shafts 20 and 22. The collar 54 has a bolt 56 extending through the split ends thereof to provide a convenient method of attaching the collar thereon. With the drum assemblies 40 thus attached to the shafts 20 and 22 it can be seen that the drums will be rotated at the same relative speed and be fixed against relative longitudinal movement on the shafts, thereby providing a basis to accurately measure the quantities of seed and fertilizer desired to be dispensed.

A housing assembly 60 fits over the parallel extending drum assemblies 40 in overlying relation and includes a base member 62 with an aperture cover plate 64 attached thereover, a pair of end plates 66 attached to the end of the base member, and a pair of bearing plates 68 attached to the lower edge of the end plates 66. The base member 62 is an elongated solid member that is rectangular in plan view and has a pair of semi-cylindrical grooves 70 cut into the lower edge thereof. The diameter of the grooves 70 is substantially the same as the diameter of the cylindrical drum assemblies 40 so that the assemblies may be received therein in rotating and sealing relationship therewith. The base member 62 has vertically downward extending openings 72 cut from the upper surface thereof to communicate with the semi-cylindrical grooves 70. The length of the openings 72 are the same as each section 50 of the drum assembly 40 and having a width slightly greater than the width of a measured compartment 48 between two of the radially extending vanes 44 of the drum assembly. Each of the openings 72 is positioned above a respective section 50 of the drum assemblies. The apertured cover plate 64 has the same area in plan view as the base 62 and as mentioned hereinbefore is attached to the top thereof, and has four openings 74 cut therethrough. The openings 74 coincide with and are of the same extent as the openings 72 in the base member 62 thereby providing a continuously downward extending opening from the upper surface of the apertured cover plate 64 through the base member 62 to the compartmented drum assembly 40. The apertured cover plate 64 includes a sliding cover 76 to permit the accurate gauging of the openings 74 extending from the hopper or reservoir 12 to the compartmented drum assembly 40. The sliding cover 76 comprises an elongated rectangular plate 78 with a vertically downwardly extending section 80 at one end thereof. The lower edge of the vertical plate 80 has an arcuate cutout 82 which, like the grooves 70, has a diameter substantially the same as the diameter of the compartmented drum assembly so as to sealingly engage therewith. The sliding covers 76 are arranged so that the vertically downward extending section 80 is at the innermost end thereof with the longitudinal plate 78 extending outwardly of the housing. The longitudinal edges of the covers 76 are received in tracks 84 cut into the lower surface of the cover plate 64. The tracks 84 are longitudinal cutouts arranged to coincide with the openings 74 in the cover plate. The width of the sliding cover 76 is somewhat wider than the width of the opening 74 and the track 84 is correspondingly wider than the cover so as to slidingly receive it therein. Similarly, the thickness of the track 84 is slightly larger than the thickness of the cover 76 so that it will slide freely therealong. Thus, when the cover plate 64 is attached to the base member 62, by means of the bolts 86, the sliding cover 76 is combined therebetween with the track defining a path longitudinal of the drum assembly 40. As the sliding cover 76 is moved inwardly or outwardly, of a section 50 of the drum assembly over which it is positioned, the vertically downwardly extending arcuate section 80 can be made to coincide with one of the discs 46 to thereby seal off a number of the measured compartments 48 located under the longitudinal plate 78 and expose only the desired number of compartments to the material being fed downwardly from the hoppers 12.

The base members 62 and the apertured cover plates 64 are prevented from moving longitudinally on the drum assemblies by a pair of end plates 66 which are attached to each end of the base members 62 by the bolts 88 and bear against the collars 54. The end plates 66 have a semi-circular cutout 90 in the lower edge thereof to provide a bearing surface for each of the shafts 20 and 22, as well as a means to position the housing assembly 60 on the shafts. The end plates 66 are of the same height and width as the base 62 thereby permitting the sliding covers 76 to pass over the top thereof. A pointer 92 is attached to the top surface of the end plate 66 by a bolt 94 to coincide with and overlie each of the sliding covers 76. The pointers 92 cooperate with indicia 96 on the sliding covers 76 to accurately indicate the position of the sliding cover with respect to its corresponding section 50 of the compartmented drum assembly. Thereby, when the openings are covered by the material in the hoppers, it is possible to accurately set the desired opening in each of the separate sections 50 of the drum assemblies.

The pair of bearing plates 68 are attached to the lower edge of the end plates 66 and have a semi-circular cutout 98 at the upper edge thereof to coincide with the semi-circular cutouts 90 to provide a bearing surface to surround the shafts 20 and 22. The bearing plates 68 are attached to the end plates 66 by bolts 100 extending therethrough. With the plates 68 thus secured in place, the housing assembly 60 is complete and fixed in position relative to the cylindrical drum assemblies.

The invention has been set forth herein showing two sections 50 on each of two cylindrical drum assemblies thereby giving a total of four sections which can measure seed or fertilizer from four hoppers. It is obvious from the structure herein that the number of sections 50 and hoppers associated with each shaft can be increased or decreased as desired by the implementation of more sections 50 or additional shafts parallel to the two shafts 20 and 22 can be provided. Thus, a combine equipped with the subject invention could be adapted to dispense as many separate materials as is desired.

The operation of the dispenser disclosed herein is relatively simple and straightforward. The hoppers or reservoirs 12 are filled with the desired materials to be dispensed which materials fill the openings 74 in the cover plate and are stopped or backed-up against the sliding covers 76. Each of the covers 76 is then withdrawn outwardly so that the desired number of rows of measured compartments 48 on the cylindrical assembly, as indicated by the indicia 90 and the pointer 92, are exposed to the supply of seed or fertilizer. With each sliding cover 76 set at the proper opening, the lawn combine to which it is attached is ready to be driven over the area on which the material is to be dispensed. When it is desired to dispense the materials, the clutch 38 can be engaged thereby driving the shaft 20 from the main drive of the combine so that the cylindrical drum assemblies will be rotated only when the combine moves over the ground. As the drums rotate each of the measured compartments 48 comes into communication with the opening leading from the reservoirs or hoppers and is filled with the material therein. The measured compartments then rotate further until they are beyond the lower edge of the base member 62 where the material in the compartments is then discharged downwardly into the collecting chute 14 to be dispensed on the ground in any manner chosen, for example, by the spinner plate 16 shown in the drawings. From this can be seen the versatility imparted by the dispenser, since it is possible to change the opening of each cover plate 76 while the device is in operation, and if desired, the hopper can be completely closed off, or any other combination of variable openings or closings.

While the invention has been particularly shown and described with reference to a preferred embodiment thereof, it will be understood by those skilled in the art that various changes in form and details may be made therein without departing from the spirit and scope of the invention.

What is claimed is:

1. A dispenser for particulate and granular material, comprising at least one cylindrical rotating dispenser assembly journalled for rotation on an object, a housing assembly having a base member with at least one semi-cylindrical groove in the lower surface thereof to receive the dispenser assembly in rotating and sealing relationship, a pair of end plates attached to the base member, a pair of bearing plates attached to the end plates, said end plates and said bearing plates having semi-cylindrical grooves therein so that when attached a cylindrical opening is formed to rotatably receive the dispenser therein, an opening extending from the upper surface of the base member to the groove in the base member, a sliding cover slideably received in the housing assembly to move longitudinally of said dispenser assembly in closing relation with said opening, wherein said sliding cover includes a horizontal section, whose longitudinal edges are slideably retained in tracks cut into the sides of the opening, a perpendicular section attached at one end to said horizontal section and the other end having a semi-circular cut-out to be sealingly received on the circumference of said dispenser assembly.

2. The device of claim 1, wherein said dispenser assembly includes a shaft journaled in the cylindrical opening and a cylindrical, compartmented drum fixed to the shaft in concentric relation for rotation therewith and received in the semi-cylindrical groove in the base member.

3. The device of claim 2, wherein said drum has a plurality of wedge-shaped compartments opening into the outer surface thereof so that when the dispenser assembly is rotated the compartments are brought into communication with the opening to receive material therefrom.

4. The device of claim 3, wherein said drum comprises a plurality of discs with a hole in the center thereof, and a plurality of wheels with radially extending spokes, with said discs and said wheels being assembled on the shaft in alternating relation wherein the circumference of said discs and said spoked wheels are the same to present a uniform exterior surface.

5. The device of claim 1, wherein said object is a lawn combine.

References Cited
UNITED STATES PATENTS

| | | | |
|---|---|---|---|
| 432,648 | 7/1890 | Swanfeldt | 222—312X |
| 587,686 | 8/1897 | Frisbee | 222—317 |
| 766,407 | 8/1904 | Wolfe | 222—317X |
| 771,137 | 9/1904 | Frerking | 222—317X |
| 1,069,527 | 8/1913 | Carman | 222—317X |
| 1,122,619 | 12/1914 | Maas | 222—317X |
| 1,437,863 | 12/1922 | Raymond | 222—317 |
| 2,237,504 | 4/1941 | Roath | 222—313 |
| 2,692,705 | 10/1954 | Marihart | 222—313 |
| 3,359,710 | 12/1967 | Anderson | 239—Lawn Mowers |
| 1,901,851 | 3/1933 | Steindorf | 308—74UX |
| 2,428,241 | 9/1947 | Pootjes | 222—368 |
| 2,611,578 | 9/1952 | Biggs | 415—219 |
| 2,907,499 | 10/1959 | Agronin | 222—368X |
| 2,997,347 | 8/1961 | Bauer | 308—74X |
| 3,071,419 | 1/1963 | Lower et al. | 308—74 |
| 3,498,727 | 3/1970 | Martin, Jr. et al. | 415—219X |

JOSEPH R. LECLAIR, Primary Examiner

S. E. LIPMAN, Assistant Examiner

U.S. Cl. X.R.

222—313, 315, 317, 368; 308—74; 415—219